(12) United States Patent
Harbers et al.

(10) Patent No.: US 8,061,884 B2
(45) Date of Patent: Nov. 22, 2011

(54) BACKLIGHT USING LED PARALLEL TO LIGHT GUIDE SURFACE

(75) Inventors: Gerard Harbers, Sunnyvale, CA (US); Mark Pugh, Los Gatos, CA (US); Serge Bierhuizen, Milpitas, CA (US)

(73) Assignee: Philips Lumileds Lighting Company, LLC, San Jose, CA (US)

( * ) Notice: Subject to any disclaimer, the term of this patent is extended or adjusted under 35 U.S.C. 154(b) by 134 days.

(21) Appl. No.: 12/171,228

(22) Filed: Jul. 10, 2008

(65) Prior Publication Data

US 2008/0266900 A1    Oct. 30, 2008

Related U.S. Application Data

(63) Continuation of application No. 11/467,499, filed on Aug. 25, 2006, now abandoned.

(51) Int. Cl.
*F21V 7/04* (2006.01)
(52) U.S. Cl. ............... 362/632; 362/612; 362/609
(58) Field of Classification Search ............ 362/612, 362/609, 632, 633
See application file for complete search history.

(56) References Cited

U.S. PATENT DOCUMENTS

| | | | |
|---|---|---|---|
| 4,143,394 A | 3/1979 | Schöberl | |
| 6,036,328 A | 3/2000 | Ohtsuki et al. | |
| 6,536,914 B2 * | 3/2003 | Hoelen et al. | 362/231 |
| 6,710,377 B2 | 3/2004 | Shimonura | |
| 6,761,461 B2 | 7/2004 | Mizutani et al. | |
| 6,789,910 B2 * | 9/2004 | Kimura et al. | 362/600 |
| 6,953,952 B2 * | 10/2005 | Asakawa | 257/103 |
| 7,001,058 B2 * | 2/2006 | Inditsky | 362/610 |
| 7,021,813 B2 * | 4/2006 | Lee et al. | 362/609 |
| 7,048,427 B2 | 5/2006 | Fujino et al. | |
| 7,157,853 B2 | 1/2007 | Imai et al. | |
| 7,176,623 B2 | 2/2007 | Nitta et al. | |
| 7,204,635 B2 | 4/2007 | Kimura et al. | |
| 7,239,792 B2 * | 7/2007 | Kim | 385/125 |
| 7,422,358 B2 * | 9/2008 | Weng et al. | 362/633 |
| 7,491,977 B2 * | 2/2009 | Fukasawa | 257/98 |
| 7,505,109 B2 * | 3/2009 | Cheng et al. | 349/161 |
| 7,513,661 B2 * | 4/2009 | Hamada et al. | 362/373 |
| 7,527,408 B2 * | 5/2009 | Hwang | 362/609 |

(Continued)

FOREIGN PATENT DOCUMENTS

EP    0974785 A1    1/2000

(Continued)

OTHER PUBLICATIONS

International Search Report and Written Opinion, 10 pages.

*Primary Examiner* — David Crowe

(57) ABSTRACT

Various embodiments of corner-coupled backlights are described, where one or more white light LEDs are optically coupled to a truncated corner edge of a solid rectangular light guide backlight. The one or more LEDs are mounted in a small reflective cavity, whose output opening is coupled to the truncated corner of the light guide. The reflective cavity provides a more uniform light distribution at a wide variety of angles to the face of the truncated corner to better distribute light throughout the entire light guide volume. To enable a thinner light guide, the LED die is positioned in the reflective cavity so that the major light emitting surface of the LED is parallel to the top surface of the light guide. The reflective cavity reflects the upward LED light toward the edge of the light guide.

6 Claims, 14 Drawing Sheets

U.S. PATENT DOCUMENTS

| | | | |
|---|---|---|---|
| 2002/0054489 A1* | 5/2002 | Hirayama | 362/31 |
| 2002/0163790 A1 | 11/2002 | Yamashita et al. | |
| 2003/0189821 A1* | 10/2003 | Moon | 362/31 |
| 2004/0012944 A1 | 1/2004 | Suzuki et al. | |
| 2004/0065894 A1 | 4/2004 | Hashimoto et al. | |
| 2005/0141244 A1 | 6/2005 | Hamada et al. | |
| 2005/0152157 A1* | 7/2005 | Nomura | 362/609 |
| 2005/0157500 A1* | 7/2005 | Chen et al. | 362/294 |
| 2006/0001037 A1 | 1/2006 | Schard et al. | |
| 2006/0098453 A1* | 5/2006 | Kuo | 362/609 |
| 2006/0164864 A1 | 7/2006 | Arihara | |
| 2006/0170335 A1 | 8/2006 | Cho et al. | |
| 2006/0181902 A1 | 8/2006 | Tamura et al. | |
| 2006/0226437 A1 | 10/2006 | Fujita et al. | |
| 2006/0262554 A1* | 11/2006 | Mok et al. | 362/555 |

FOREIGN PATENT DOCUMENTS

| | | |
|---|---|---|
| JP | 2006189796 A | 7/2006 |
| WO | WO 2005114045 A1 * | 12/2005 |

* cited by examiner

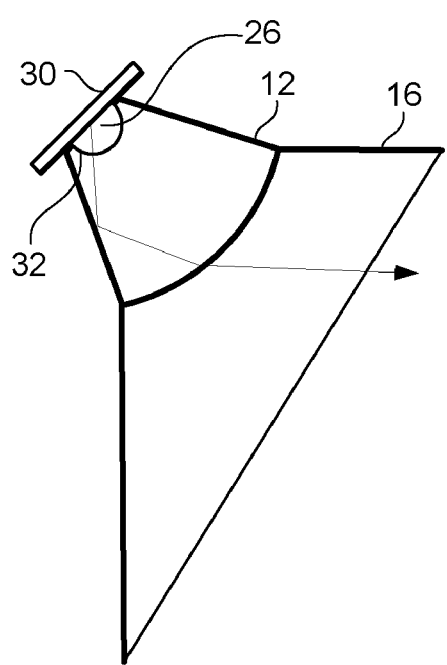 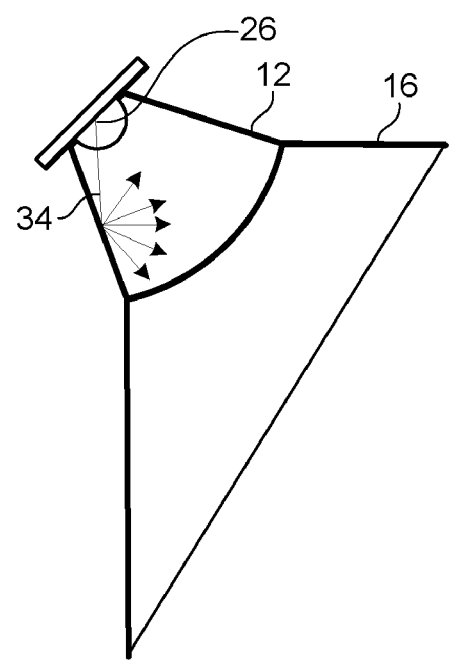
FIG. 8  FIG. 9

BACKLIGHT USING LED PARALLEL TO LIGHT GUIDE SURFACE

CROSS-REFERENCE TO RELATED APPLICATIONS

This is a continuation application based on U.S. application Ser. No. 11/467,499, filed on Aug. 25, 2006, entitled Backlight Using High Powered Corner LED.

FIELD OF THE INVENTION

This invention relates to backlights for liquid crystal displays and, in particular, to illuminating the backlight using a light emitting diode (LED).

BACKGROUND

There are many type of backlights used for liquid crystal displays (LCDs). Generally, for full color backlights, the light used to illuminate the backlight has red, green, and blue components. Fluorescent lamps are most commonly used as the light source. With the development of high power LEDs, such LEDs have been replacing the fluorescent lamps in some applications. A combination of red, green, and blue LEDs may be used, or "white light" LEDs may be used. A white light LED uses a blue or UV LED coated with a wavelength-converting phosphor so that the resulting light appears white.

A typical backlight for a small or medium size LCD uses a solid, transparent light guide formed of a polymer. The light source, either a fluorescent bulb or LEDs, is optically coupled to one side edge of the rectangular light guide. The light guide may be in the shape of a wedge or have facets or other types of reflectors that uniformly leak light out of the face of the light guide onto the liquid crystal layers. The red, green, and blue pixel locations of the liquid crystal layer are controlled by electrical signals to effectively act as light shutters for the RGB pixels to create a color image on the LCD screen.

In backlights where only one or a small number of LEDs are used, it is known to form the light guide to have a flattened corner edge, such as a 45 degree angle corner, and mount the LED package in contact with the face of the truncated corner. This is described in U.S. Pat. No. 7,001,058. A suitable LED package for mounting at the corner may be that described in U.S. Pat. No. 6,953,952, which shows an LED package with a window having an area less than 3 mm$^2$. Both patents are incorporated herein by reference. By coupling the LED to the flattened corner, rather than to a relatively long side of the light guide, the light more fully spreads throughout the light guide volume to provide a more uniform illumination of the liquid crystal layers. However, with such corner-coupled LEDs, there is still significant optical coupling inefficiency and nonuniformity, and such backlights have only been suitable for small backlights due to the small coupling area. The nonuniformity is partially a result of a point source of light being applied to a surface of the light guide, rather than a wide homogeneous light source, such as a fluorescent bulb, applied to the surface of the light guide. Further, there are variations in the light emitted by the LED, such as due to color variations across the LED due to uneven deposition of phosphor, or variations in the emission profile of the LED die itself, or varying properties in the LED package. Additionally, if high power LEDs are used, it is difficult to remove heat from the LED without incurring additional area requirements.

SUMMARY

Various embodiments of corner-coupled backlights are described, where one or more LEDs are optically coupled at or proximate to a corner of a rectangular light guide backlight.

In one embodiment, a high-power, white light LED is mounted in a small reflective cavity, whose open end is then optically coupled to the face of a truncated (e.g., flattened) corner of the light guide. The reflective cavity provides a more uniform light distribution at a wide variety of angles to the face of the truncated corner to better distribute light throughout the entire light guide volume.

Because the LED is housed in the reflective cavity and thus separated from the light guide surface, there is a reduced angle between the light guide coupling surface and the LED. Thus, the maximum angle of light from the LED directly impinging on the light guide surface without being reflected by the reflective cavity is relatively small (e.g., 30-60 degrees relative to a line normal to the LED surface). The light emitted by the LED at wider angles is first reflected by the reflective cavity prior to being incident upon the surface of the light guide. The reflective cavity thus acts to spread out the LED light before impinging on the light guide surface so that the light fills the entire volume of the light guide. Further, variations in the light emitted by the LED itself are smoothed out by the reflective cavity and the separation of the LED from the light guide surface. This creates a more uniform light guide emission into the liquid crystal layers.

Various types of reflective cavities are described, along with various shapes of the truncated corner portion of the light guide.

One or more LEDs may be mounted in the same cavity. In one embodiment, to create white light, a wavelength-converting phosphor is located over a blue or UV LED. In another embodiment, red, green, and blue LEDs are located in the same reflective cavity. Other combinations of LED types are described.

LEDs may be coupled to any number of the four corners of the light guide for additional brightness or uniformity.

In other embodiments, a side-emitting LED is mounted in a small cavity (e.g., a hole) near a corner of the light guide, and a reflector is mounted on the corner of the light guide.

Other embodiments are also described.

BRIEF DESCRIPTION OF THE DRAWINGS

FIG. 8 is a top down cross-sectional view of a concave corner portion of a backlight showing the LED, a tapered sidewall reflective cavity, and light rays emitted by the LED.

FIG. 9 is a top down cross-sectional view of a concave corner portion of a backlight showing the LED, a tapered sidewall diffusing-reflective cavity, and light rays emitted by the LED.

Elements labeled with the same numerals in the various figures may be the same or equivalent.

DETAILED DESCRIPTION

Figure 1:
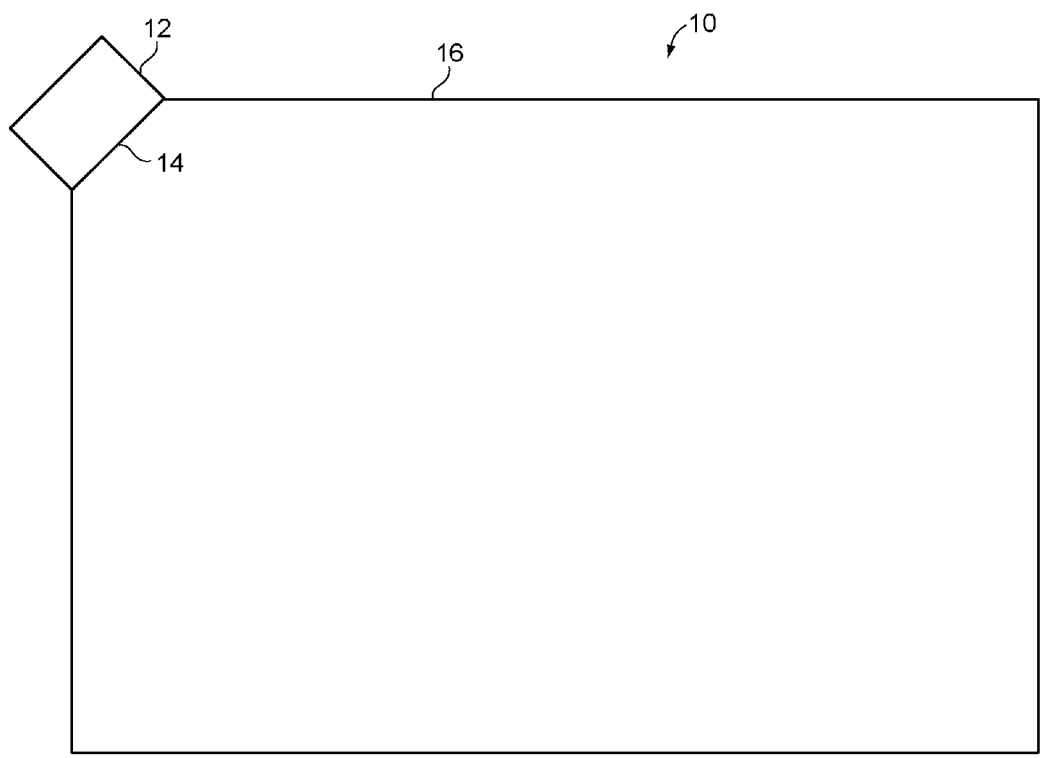
FIG. 1 is a top down view of an LCD having a backlight, where the backlight comprises a substantially rectangular light guide with one or more LEDs housed in a reflective cavity optically coupled to a corner of the light guide.
Figure 2:
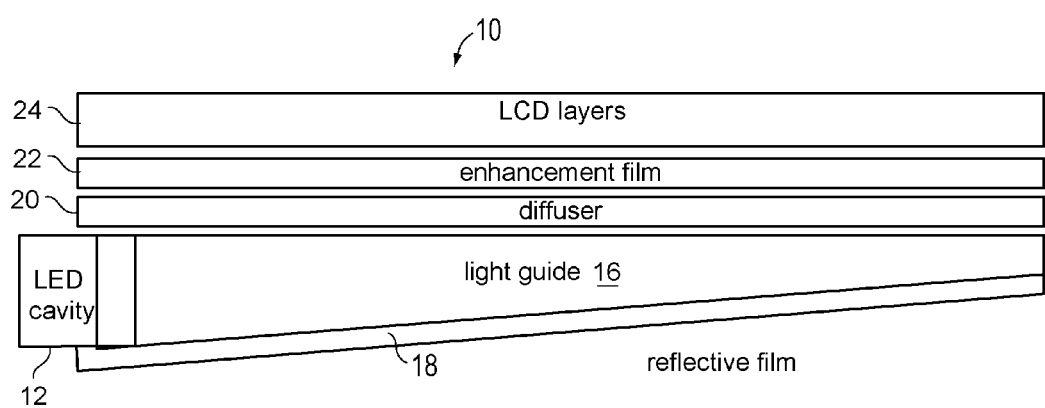
FIG. 2 is a side view of the LCD of FIG. 1 showing a wedge shaped rectangular light guide.

FIG. 1 is a top down view of a color LCD 10, shown in greater detail in FIG. 2. One or more LEDs are housed in a reflective cavity 12. The cavity 12 is affixed to a flattened (or truncated) corner 14 of a rectangular light guide 16.

FIG. 2 is a side view of the LCD 10 of FIG. 1 with various layers separated for ease of explanation. Light emitted from the reflective cavity 12 enters a corner of the light guide 16. The light guide 16 is typically a transparent polymer (e.g., PMMA), or may be another transparent material, such as glass. A reflective film 18, such as a thin aluminum film or sheet, combined with total internal reflection by the light guide, reflects all light upward and out of a top surface of the light guide 16. The exiting light is diffused by a diffuser 20. An enhancement film 22 may be used to brighten the light within a narrow viewing angle. The resulting light is then incident upon the back surface of liquid crystal layers 24, which are very well known and need not be described in detail. One type of liquid crystal layers basically consist of a bottom polarizer, a transparent ground layer, a liquid crystal layer, a transparent thin film transistor (TFT) array, an RGB filter corresponding to the RGB pixel locations, and a second polarizer. Signals applied to the TFT array at selected pixel locations change the polarization of light and cause light at that pixel location to be output from the LCD as a red, green, or blue pixel. By proper selection of the TFT signals, color images are produced by the LCD. Other types of liquid crystal layers for use with a backlight are known, and the invention may be used with any display using a backlight.

Figure 3:
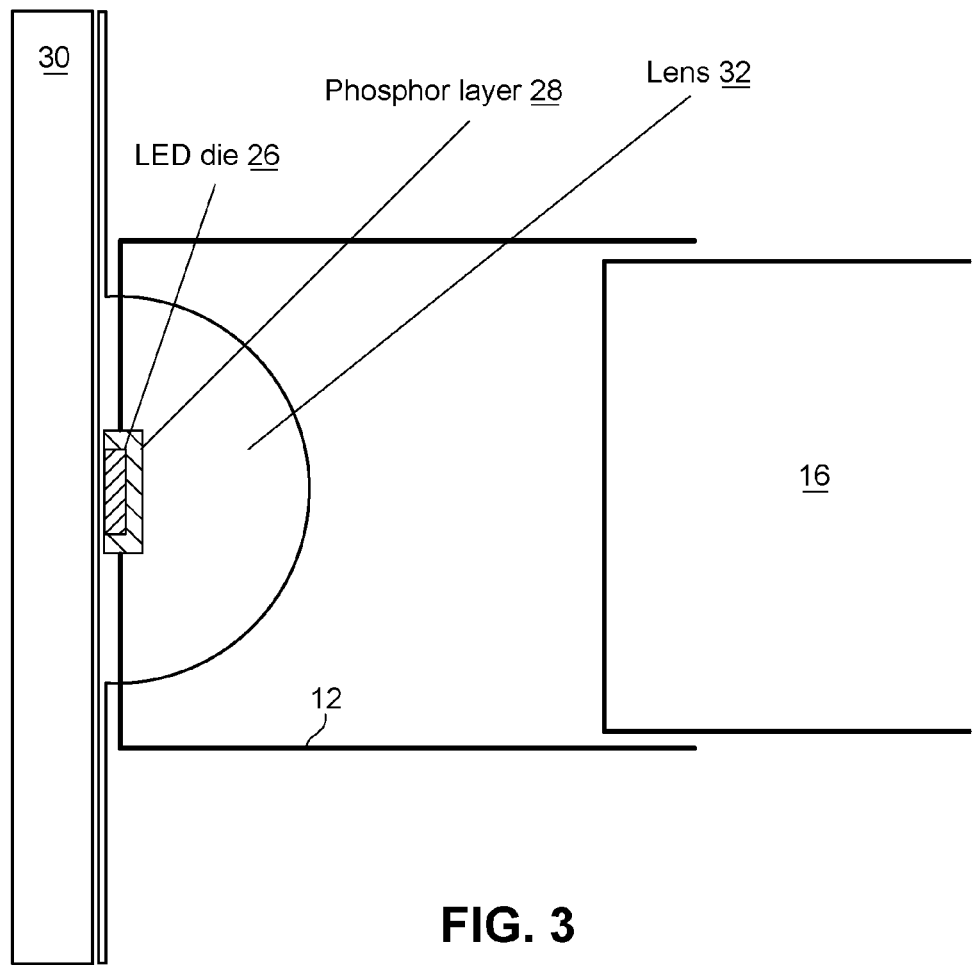
FIG. 3 is a side cross-sectional view of an LED encapsulated by a lens housed in a reflective cavity, optically coupled to a corner of a light guide, such as the light guide of FIG. 2.

FIG. 3 is a cross-section of one embodiment of the LED and reflective cavity 12. The LED die 26 emits blue light and is typically formed of an AlInGaN based material. A UV LED may also be used. Over the LED 26 is formed a phosphor layer 28. A phosphor plate may be used instead of a phosphor layer formed over the LED. The phosphor is typically a YAG phosphor that emits a yellow-green light when excited by blue light. Some of the blue light leaks through the phosphor layer 28, and the combination of the blue light and YAG emission produces white light. In another embodiment, a green phosphor (SSON) in combination with a red (eCas) or red-orange (BSSN) phosphor can be used to achieve a higher color gamut.

The LED die 26 is mounted on a submount 30. Metal pads on the LED die 26 are bonded to corresponding pads on the submount 30. The LED die 26 may be a flip-chip, or the bonds may be by wires. The submount 30 has terminals that electrically connect to a power supply. The submount 30 may be bonded to a printed circuit board (PCB) by direct bonding or wire bonding, where the PCB has an electrical connector for connection to the power supply. In addition to the submount 30 acting as an electrical interface between the power supply and the LED die, the submount 30 also acts as a heat sink to remove heat from the LED die 26. The top surface of submount 30 may be reflective to reflect the LED light towards the light guide 16.

Typical sizes for LED dies are 0.3 mm to 1 mm. The LED die 26 is preferably a high power LED so that only one LED is needed for the backlight. In one embodiment, the LED emits between 10-200 lumens and can handle drive currents ranging between 100 mA and 1.5 Amps. It is anticipated that the typical LEDs used in most embodiments will have a maximum power rating of at least 0.5 W. In the future, a single LED may replace a single fluorescent bulb typically used for backlights in laptop computers and other medium size LCDs. Currently, 2-4 LEDs are required to replace a single fluorescent lamp, depending on the size of the backlight.

Figure 4:
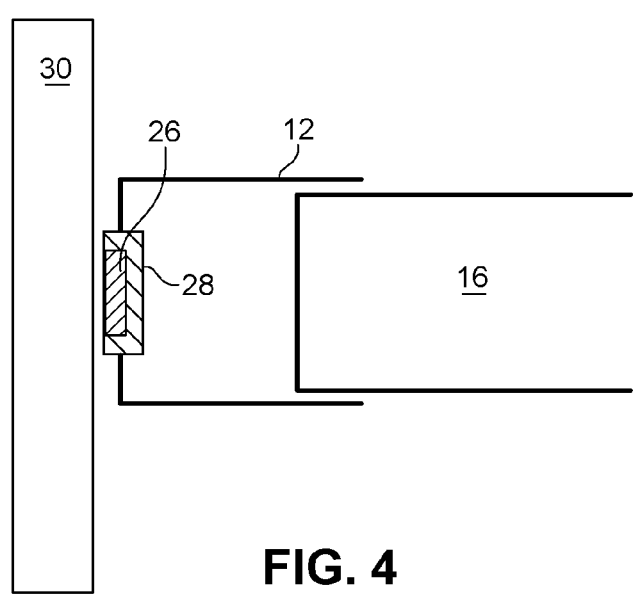
FIG. 4 is a cross-sectional view of an LED, with no lens, housed in a reflective cavity, optically coupled to a corner of a light guide.

The LED die 26 is encapsulated by a lens 32. The lens 32 may have a diameter of 2-6 mm. For very thin light guides, even the 2 mm lens is too big and may be deleted. FIG. 4 illustrates an embodiment of a very thin (e.g., 2 mm) light guide 16 where the lens is not used. By not using a lens, there is a lower efficiency of light exiting the LED die 26 but a higher in-coupling efficiency into the light guide 16. In all of the embodiments, either a lensed or unlensed LED may be used.

The inner walls of the reflective cavity 12 may be highly reflective enhanced aluminum or silver coated mirrors or other reflective material so that virtually all light entering the cavity 12 exits into the light guide 16. Suitable aluminum mirrors are available from Alanod Corporation and reach reflectivities of 92-97%. The cavity 12 may be clamped on or affixed onto the light guide 16 with an adhesive. The submount 30 may be snapped into place on the cavity 12 or affixed with an adhesive or by other means.

For optimum uniformity of light output by the light guide, the opening of the reflective cavity 12 should approximately match the face of the flattened portion of the corner (or other shape of the corner) so there are no light voids at the edges of the corner in the light guide. Also by providing a large opening of the cavity 12, the light becomes incident upon the light guide surface with fewer reflections by the cavity 12. For purposes of this disclosure, approximately matching the opening of the cavity to the face of the truncated corner is a matching within 75-100%, meaning that at least 75% of the corner face is covered by the cavity 12. The light output opening of the reflective cavity will typically be at least 4 mm$^2$, corresponding to a relatively small corner coupling area.

Figure 5:
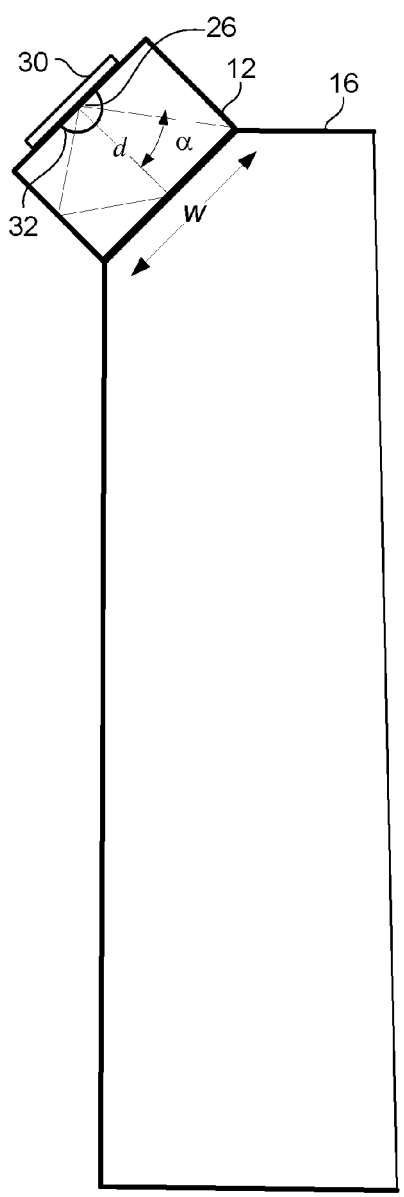
FIG. 5 is a top down cross-sectional view of a flattened corner portion of a backlight showing the LED, the reflective cavity, and light rays emitted by the LED.

FIG. 5 illustrates two light rays from the LED die 26, where one of the rays is reflected off a wall of the cavity 12, and the other ray just clears the far edge of the cavity. The ray that does not get reflected by the cavity 12 has a maximum angle $\alpha$ relative to a line normal to the surface of the LED die. Any light that reflects off the light guide is recycled by the cavity 12.

By locating the LED die 26 further away from the light guide 16, the angle $\alpha$ becomes smaller. This angle $\alpha$ is in accordance with the equation tan $\alpha$=w/2d, where w is the total width of the flattened corner and d is the distance from the LED die 26 to the middle of the flattened corner. A good tradeoff between uniformity, size of cavity, and in-coupling efficiency is to cause the angle $\alpha$ to be between about 30-60 degrees. This results in the distance d to be in the range of about w/3.5 to w/2; however, a distance d of w/5 (corresponds to $\alpha$=68 degrees) or greater may be suitable. The larger the corner face, the larger the reflective cavity 12 will be. The LED die will typically be within a distance of 1-15 mm from the in-coupling surface of the light guide. A distance of 1 mm would correspond to a corner edge width of 3.5 mm for a 60 degree beam illumination, and 15 mm would correspond to a corner edge width of 17.5 mm for a 30 degree beam illumination.

Thus, the maximum angle $\alpha$ of light from the LED directly impinging on the light guide surface without first being reflected is smaller compared to the prior art, where the LED is essentially adjacent the corner face. The light emitted by the LED at angles wider than $\alpha$ is first reflected by the reflective cavity 12 prior to being incident upon the surface of the light guide 16. The reflective cavity 12 thus acts to spread out the LED light over the entire opening of the cavity 12, similar to the effect of a fluorescent bulb. This creates a more uniform distribution of light in the light guide volume, as opposed to a point source of light being coupled into the light guide.

Any number of corners (1-4) of the light guide 16 may be flattened and have LEDs housed in reflective cavities mounted thereon as shown in FIG. 5. This increases brightness and uniformity. A flat corner face is typically at a 45 degree angle with both adjacent sides of the rectangular light guide.

Figure 6:
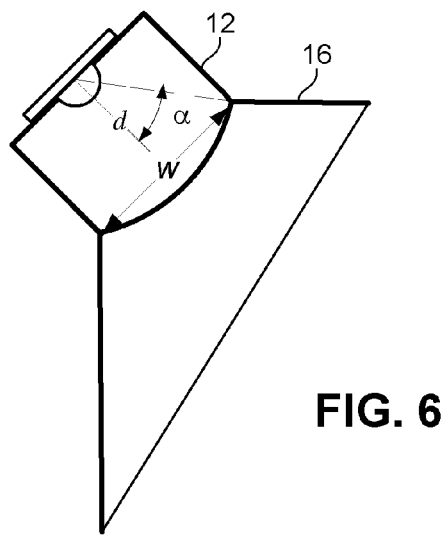
FIG. 6 is a top down cross-sectional view of a concave corner portion of a backlight showing the LED and the reflective cavity.

FIG. 6 illustrates an embodiment where the truncated corner is concave. This improves the in-coupling efficiency since the incident light is at a smaller angle relative to a line normal to the surface of the light guide. Accordingly, the corner surface will be less than 45 degrees relative to the nearest adjacent side of the light guide.

Figure 7:
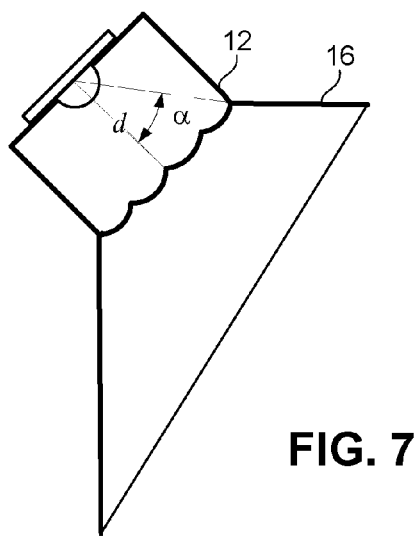
FIG. 7 is a top down cross-sectional view of a scalloped corner portion of a backlight showing the LED and the reflective cavity.

FIG. 7 illustrates an embodiment where the truncated corner is scalloped to further improve the in-coupling efficiency.

FIG. 8 illustrates an embodiment where the walls of the reflective cavity 12 are tapered. Benefits of this embodiment are that the reflective cavity 12 is smaller than a rectangular cavity, and a higher in-coupling efficiency is obtained due to the smaller angle of incident light upon the surface of the light guide 16.

FIG. 9 illustrates an embodiment where the walls of the reflective cavity 12 are tapered and the walls are diffusively reflective, as illustrated by the scattering of the light ray 34. Alanod Corporation manufactures aluminum mirrors with different scattering properties that are suitable. The cavity walls may even be coated with a suitable white paint. Benefits of this embodiment are that the diffused light creates a more uniform illumination over the entire surface of the corner face to increase the uniformity of light emitted by the light guide into the liquid crystal layers.

Figure 10:
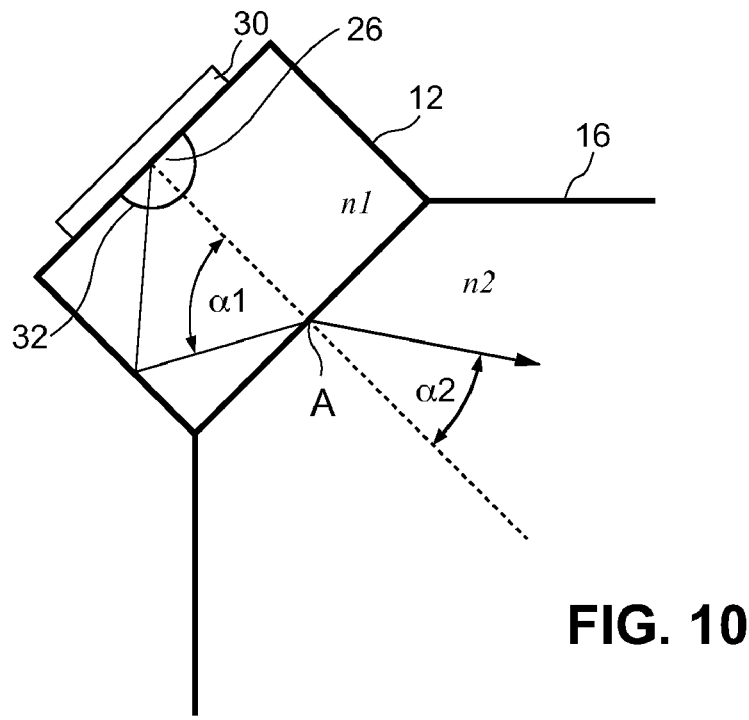
FIG. 10 is a top down cross-sectional view of a flattened corner portion of a backlight showing the LED, a reflective cavity, and light rays with angles emitted by the LED.

FIG. 10 is the same as FIG. 5 but identifies the indexes of refraction (n1 and n2) of the reflective cavity medium (e.g., air or epoxy) and the light guide material (e.g., glass or plastic), as well as the entrance angle $\alpha$1 and exit angle $\alpha$2 of a light ray at the cavity/light guide interface point A.

Figure 11:
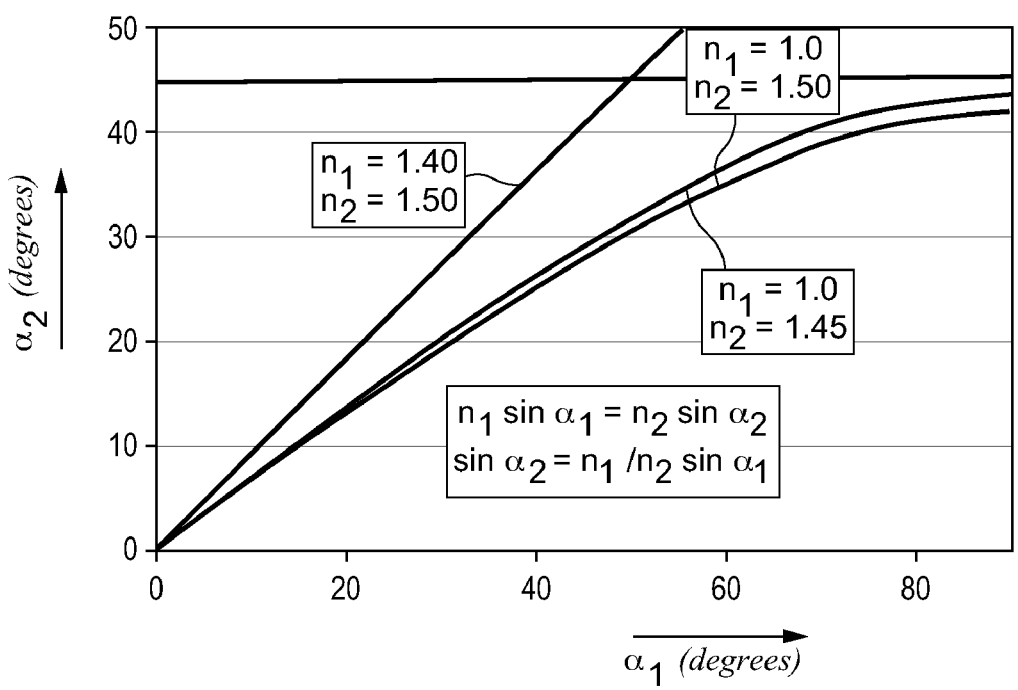
FIG. 11 is a graph showing the incident ray angles and resulting refracted ray angles for the structure of FIG. 10 for materials with various indexes of refraction.

FIG. 11 is a graph of the angles $\alpha$1 and $\alpha$2 for different indexes of refraction of the cavity medium and light guide material. For optimum uniformity of light emitted by the light guide into the liquid crystal layers, there should be an even light distribution across the flattened corner face of the light guide through $\alpha$2=+/−45 degrees. The 45 degree target line is illustrated in FIG. 11. In the case of an unencapsulated cavity 12 (the cavity is filled with air, n=1), the light guide edge has to be illuminated with large angles to come close to the 45 degree target. In these cases, it is beneficial to use a slight curvature on the light guide edge, as shown in FIG. 6, to make sure that the light reaches all the corners of the light guide, especially if it is taken into account that there will be less light in these large angles due to more losses in the reflective cavity 12.

Figure 12:
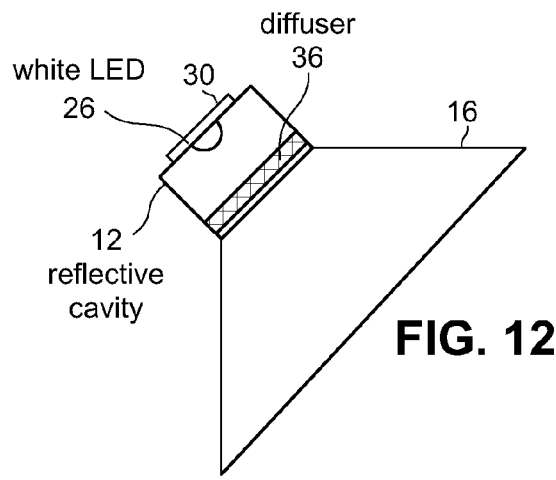
FIG. 12 is a top down cross-sectional view of a flattened corner portion of a backlight showing a single white light LED, a reflective cavity, and a diffuser at the cavity exit.

The complexity of achieving good uniformity out of the light guide can be greatly reduced if good uniformity is achieved over the in-coupling edge. In FIG. 12, by using a diffuser 36 between the LED die 26 and the coupling edge, a much better uniformity can be accomplished. It is in particular beneficial to place the diffuser 36 close to the in-coupling edge, as the LED die 26 in combination with the reflective cavity 12 will be able to illuminate the diffuser 36 more uniformly. The diffuser 36 may be a roughened translucent plate or other type of diffuser.

Figure 13:
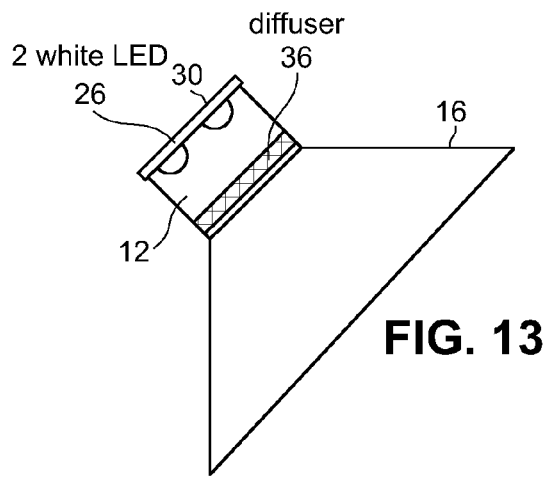
FIG. 13 is a top down cross-sectional view of a flattened corner portion of a backlight depicting at least two white light LEDs, a reflective cavity, and a diffuser at the cavity exit.

FIG. 13 is similar to FIG. 12 but there are two or more white LED dies 26 for added brightness. Using multiple LEDs also creates an average light to mitigate variations in the individual LED's output from a target brightness and color point. This effectively improves the yield of suitable LED dies 26. The LED dies 26 may be mounted on the same submount 30 or on different submounts.

Figure 14:
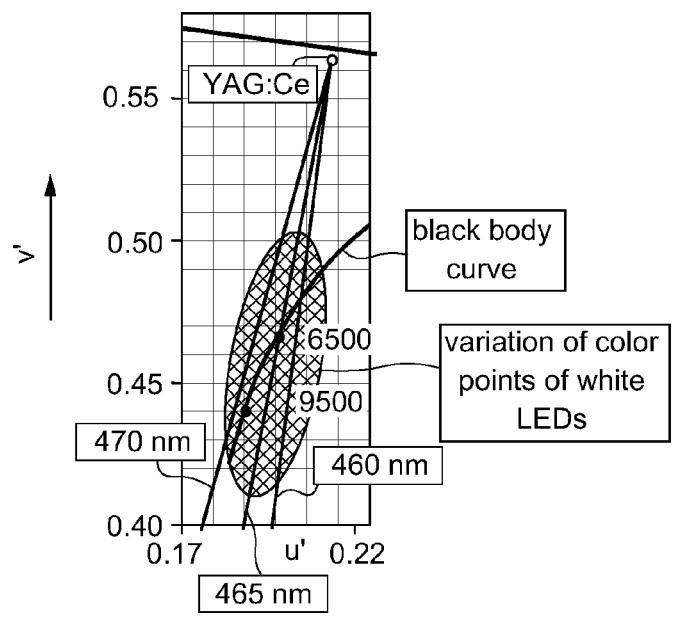
FIG. 14 is a CIE color diagram showing how the YAG phosphor color component from a white light LED can be combined with the blue light of the LED to achieve a color that can substantially match an accepted standard color point for a backlight.

FIG. 14 is a CIE color diagram, including the so called black body curve showing the color points of a black body when emitting light at very high temperatures. Two points are indicated in particular, the 6500K color point, and the 9500K color point. For backlighting, these are two relevant color temperatures, as the 6500K color point is the white point specified by international display standards, and the 9500K color point is a very popular display color point. Also indicated in this curve is the color point of a typical phosphor YAG:Ce used in a white LED. The color points of white LEDs lie on a line between this YAG:Ce color point, and the color points of the blue LEDs being used. Three lines are shown for three different color points of the blue LEDs (460 nm, 465 nm, and 470 nm). In actual LED manufacturing, blue wavelength varies, and in order to reach a high yield, blue LEDs of different color points have to be used. In addition, not only the blue wavelength varies, but also the Ce concentration in the phosphor, as well as the thickness of the phosphor, varies so that in practice there can be a large spread in the white points of white LEDs, as indicated by the ellipse in this graph. By determining the white point of the LEDs in advance, and using two or more white LEDs, the LEDs can be chosen such that the combined white point of the two or more LEDs has much less spread than if a single white LED were used for the backlight.

Figure 15:
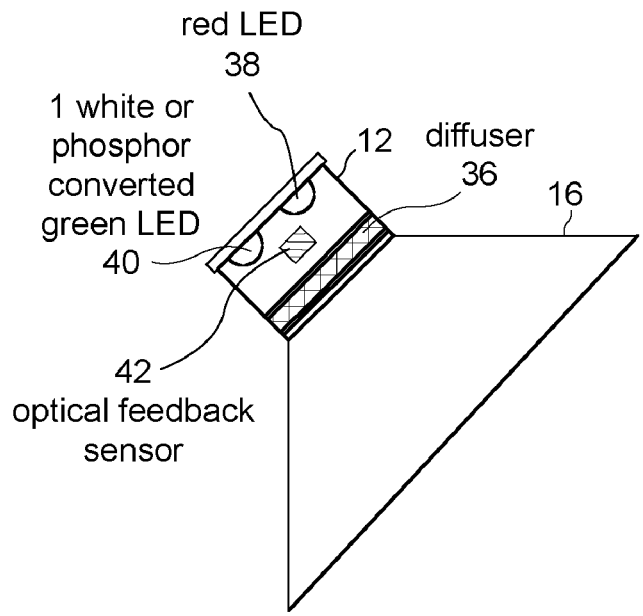
FIG. 15 is a top down cross-sectional view of a flattened corner portion of a backlight depicting a white light or phosphor-converted green LED along with a red LED in the reflective cavity. A feedback sensor is used for color point control.

As shown in FIG. 15, to get good color gamut, it is beneficial to use a separate red LED 38 and a separate white LED or phosphor-converted green LED 40. The phosphor-converted green LED uses a blue LED die and a phosphor that emits green light when energized by blue light and also leaks a portion of the blue light. It is beneficial to use a phosphor-converted green LED, with sufficient blue leakage, such that all the primary color components (red, green and blue) are available to the LCD. Depending on the color balance and the efficiency of the LEDs, also two phosphor-converted green LEDs can be used with one red LED, or two red LEDs and one phosphor-converted green LED can be used, or a combination of phosphor-converted red and a phosphor-converted green (one or more of each) may be used. The main benefit of using a phosphor-converted light instead of direct red or green LEDs is the color stability. The direct red (AlInGaP) and direct green (InGaN) color points depend on drive current and temperature, whereas most of the phosphors have only limited dependence on temperature and no dependence on drive current.

For color point control, an optical feedback sensor 42 can be integrated into the reflective cavity 12, for example near the bottom of the side mirrors. The feedback sensor 42 may detect the relative intensities of the red, green, and blue color components and control currents to each of the LEDs to achieve a target color point. As an alternative to placing the optical feedback sensor 42 in the LED cavity, the sensor 42 can also be mounted on one of the edges of the light guide 16, opposite the light source.

Figure 16:
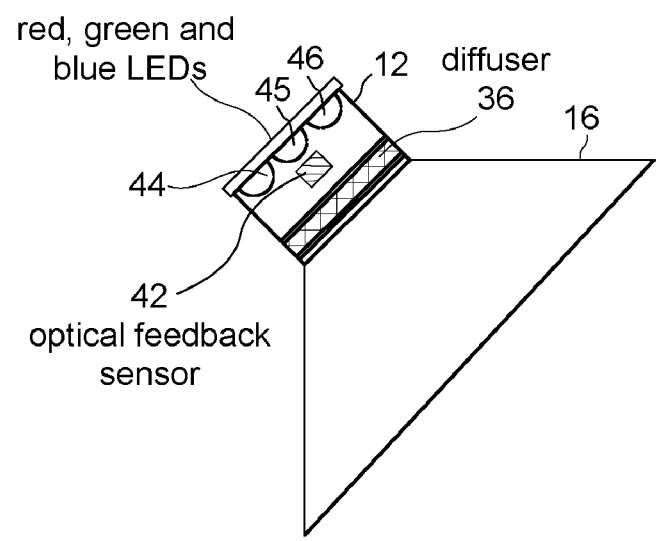
FIG. 16 is a top down cross-sectional view of a flattened corner portion of a backlight depicting red, green, and blue LEDs in the reflective cavity.

In FIG. 16, one or more separate blue, green, and red LEDs 44, 45, and 46 are used (either phosphor-converted or direct). Very high color gamuts can be achieved in this way and, by independent control of each of the LEDs, the white point can be changed in real time. Further, the backlight can be illuminated in a rapid red, green and blue sequence, as for example required for field-sequential color operation, where the LCD is used without any color filters, and the color images are made by displaying the red, green and blue image content in rapid sequence, synchronized with the red, green and blue illumination modes.

As in all embodiments, additional LEDs may be used and additional corners may be coupled to the reflective cavities. Such would be the case for large LCD displays.

Figure 17:
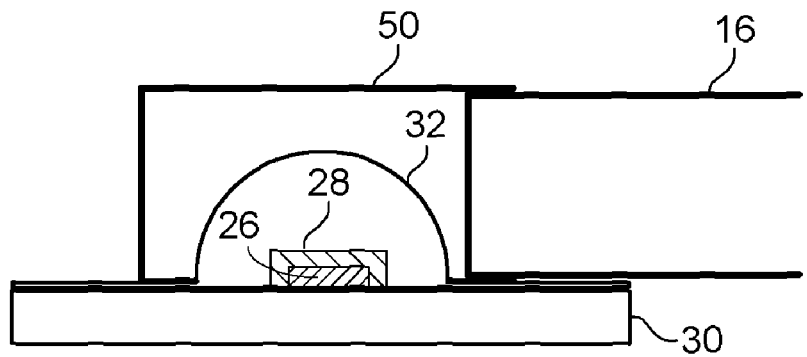
FIGS. 17, 18, and 19 are side cross-sectional views of a flattened corner portion of a backlight showing an LED within a reflective cavity, where the LED is mounted on a surface parallel to a top or bottom surface of the light guide to achieve a thinner backlight.
Figure 18:
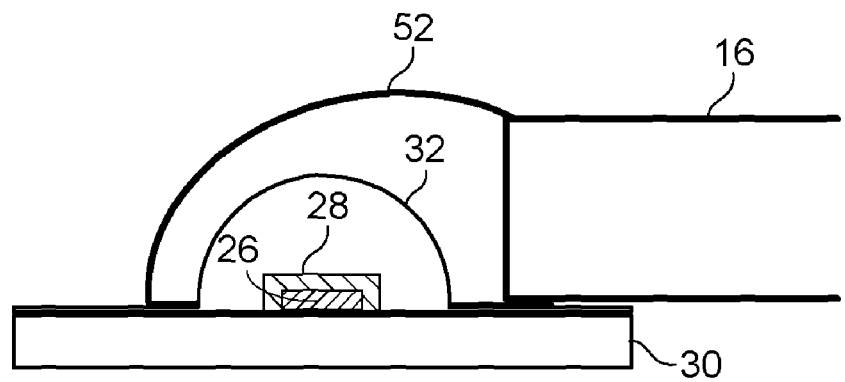
Figure 19:
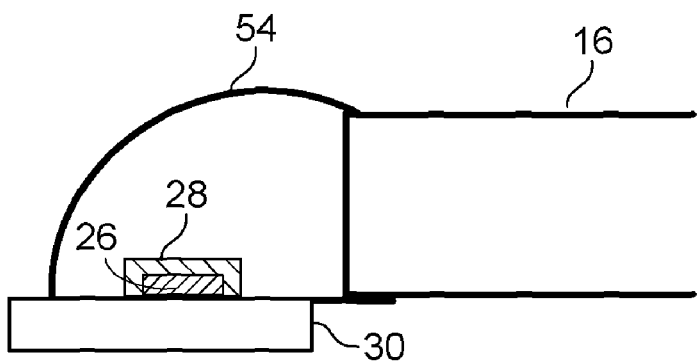

To reduce the total thickness of the LCD, the LED module can be placed in the same plane as the light guide plate, as shown in FIGS. 17-19. Each of the LEDs in FIGS. 17-19 is a white LED comprising a blue LED die 26 and a phosphor layer 28. Red, green, and blue LEDs may be used instead, as described above, to create white light. For a lens 32 with a diameter of 5 mm, the height of the lens 32 is only 2.5 mm, and the thickness of the light guide 16 can be reduced by 2.5 mm compared to the light guides in previous embodiments.

FIG. 17 illustrates the use of a rectangular reflective cavity 50. In FIG. 18, the reflective cavity 52 is made approximately elliptical to improve coupling efficiency to the light guide 16 by reducing the angle of the incident light on the edge of the light guide 16. One focal point of the ellipse would be located at the position of the LED die and the other at the center of the in-coupling edge. The cavity may also be parabolic.

FIG. 19 illustrates an embodiment similar to FIG. 18 but no lens is used on the LED die 26. As such, the LED module is smaller, and a smaller reflective cavity 54 is used. The reflective cavities in FIGS. 17-19 are coupled to truncated corners of the light guide 16 for maximum light uniformity in the light guide.

Figure 20:
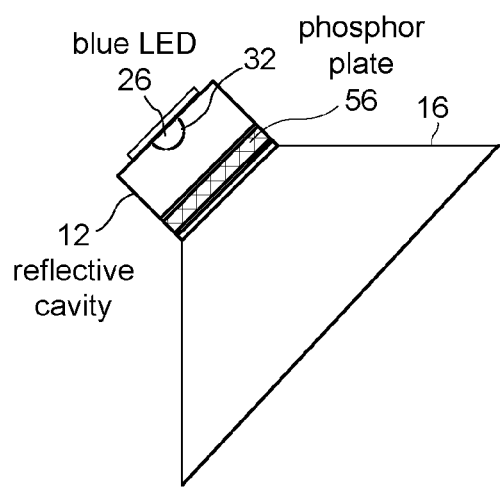
FIGS. 20, 21, and 22 are top down cross-sectional views of a flattened corner of a backlight where a phosphor plate is located near an exit of the reflective cavity, and the LED(s) is a blue or UV LED.

As illustrated in FIG. 20, instead of putting the phosphor layer on the blue LED die 26, the phosphor can also be made in the form of a diffusing phosphor plate 56, or screen printed on a transparent carrier or diffuser plate (alternatively identified as 56), which is separate from the LED die and placed in proximity to the edge of the light guide 16. Thus plate 56 acts both as a diffuser and color conversion means. This has the benefit that very good uniformity is obtained.

Figure 21:
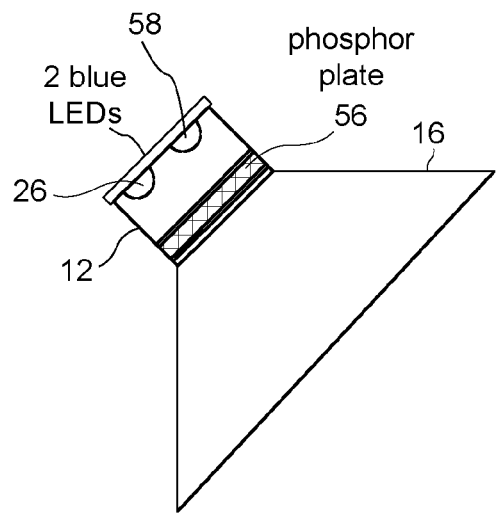

FIG. 21 illustrates the use of two blue LED dice 26 and 58 in the reflective cavity 12 of FIG. 20. By using two (or more) blue LED dice, a higher luminance is achieved for larger displays, and the light from two LEDs is averaged to achieve a desired color point. This increases the yield of the blue LEDs, since a blue LED with a short wavelength and a blue LED with a long wavelength can be used together to achieve a desired color point.

As in all embodiments, the LEDs can be various types using different phosphors and different direct LED colors to achieve the desired white point. For example, the phosphor may be YAG, or a combination of red and green phosphor, or a YAG and red phosphor. Instead of two blue LEDs being used, a blue and a red LED may be used, where a YAG or green phosphor plate near the cavity's exit is excited by the blue LED and allows the red light to pass through with little absorption. UV LEDs may also be used with suitable phosphors providing the red, green, and blue components.

Figure 22:
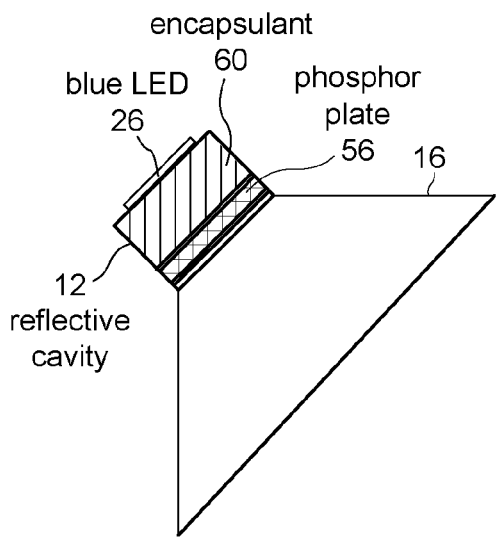

FIG. 22 illustrates the embodiment of FIG. 20 or 21, but no lens is used and the cavity 12 is filled with an encapsulant 60 (e.g., silicone). This has the benefit that the LED die and optional wirebonds are protected, and a higher extraction efficiency is achieved out of the blue die by providing interfacing materials with similar indexes of refraction.

Figure 23:
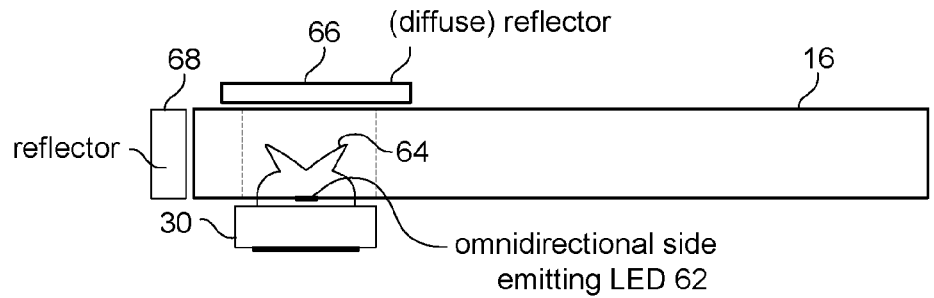
FIG. 23 is a side cross-sectional view of a backlight using a side-emitting LED mounted within a cavity formed near a corner of the light guide.

FIG. 23 illustrates an embodiment where a side-emitting LED 62 is inserted into a cavity (such as a round hole) formed near a corner of the light guide 16. The cavity is preferably within 15 mm from the corner of the light guide. The LED 62 uses a standard white LED (blue die plus phosphor layer) with a side-emitting lens 64 that reflects and refracts light such that light is emitted at a low angle 360 degrees around the LED. Multiple LEDs supplying red, green, and blue color components may also be used instead of one white LED. High power side emitting LEDs are available from Philips Lumileds Lighting, LLC, under the Luxeon trade name. Due to the omnidirectional nature of the light emission, all corners of the light guide are supplied with direct light from the LED so the light guide supplies uniform brightness to the liquid crystal layers. To prevent any light from the top of the lens 64 creating a bright spot, a diffusing reflector 66 is placed above the LED 62 on the light guide 16. A specular reflector 68 is provided around the corner of the light guide 16 near the LED, since the light emitted by the LED is at a small angle relative to the near corner edges and would be transmitted out through the sides of the light guide rather than being internally reflected had the reflector 68 not been employed. The LED submount 30 may be affixed to the light guide by an epoxy or any other adhesive, or may be snapped into place using appropriate fasteners.

Figure 24:
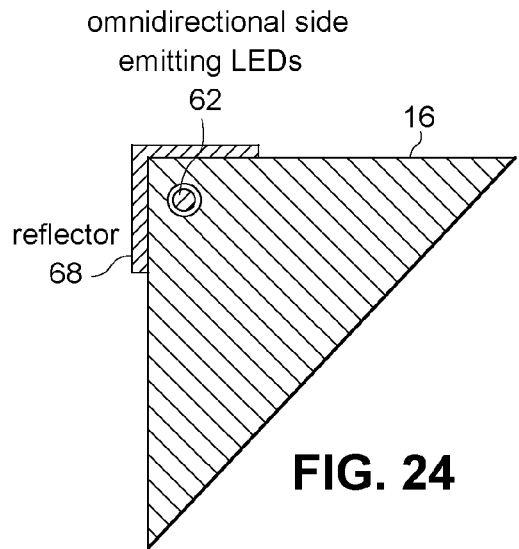
FIGS. 24, 25, and 26 are top down views of a light guide having a side-emitting LED(s) mounted in a cavity near a corner of the light guide and a reflector mounted around the corner of the light guide.

FIG. 24 is a top down view of the backlight of FIG. 23.

Figure 25:
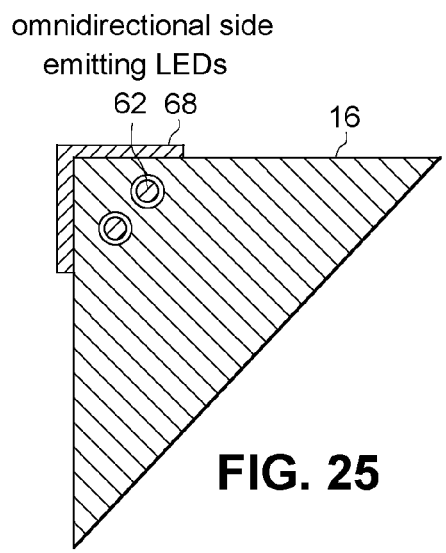

FIG. 25 illustrates the use of two or more side-emitting LEDs in the configuration of FIG. 23. The LEDs may be the same type to average out the light, or may be different types as described above.

Figure 26:
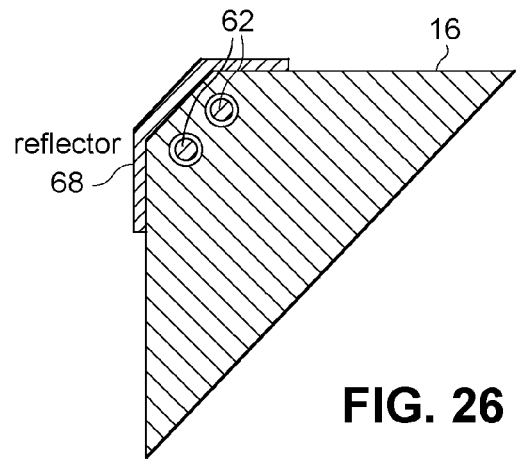

FIG. 26 illustrates the backlight of FIG. 25 but where the corner of the light guide 16 is flattened to better distribute the light throughout the light guide. The reflection by reflector 68 reflects light directly toward the far end of the light guide. Other shapes of the corner may also be employed to evenly distribute the light.

Figure 27:
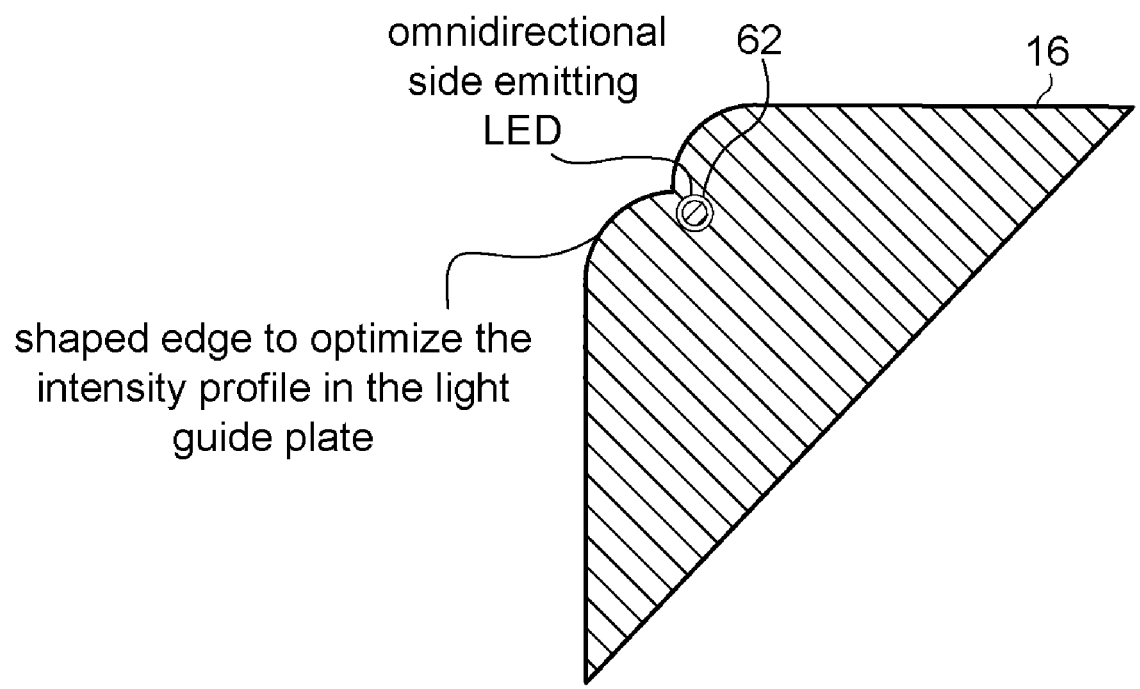
FIG. 27 is a top down view of a light guide having a side-emitting LED mounted in a cavity near a corner of the light guide, where the corner has a shaped edge to better reflect the light back into the light guide and to achieve a desired intensity profile in the light guide to achieve good uniformity.

FIG. 27 illustrates the use of a side-emitting LED embedded in a light guide, where the corner is scalloped shaped. The shape of the corner may be made such that almost all light incident on the corner area is at a large angle (greater than the critical angle) so is internally reflected, which obviates the need for an external reflector around the corner. The shape of the corner may also be optimized to get an optimal distribution of light throughout the light guide for achieving good uniformity and efficiency, wherein an external reflector film may be applied over the shaped edge.

FIGS. 28-33 illustrate how a wall of the highly reflective cavity 12 can also be continued and expanded to serve as a bottom reflector for the light guide 16 to simplify construction and to cool the LED.

Figure 28:
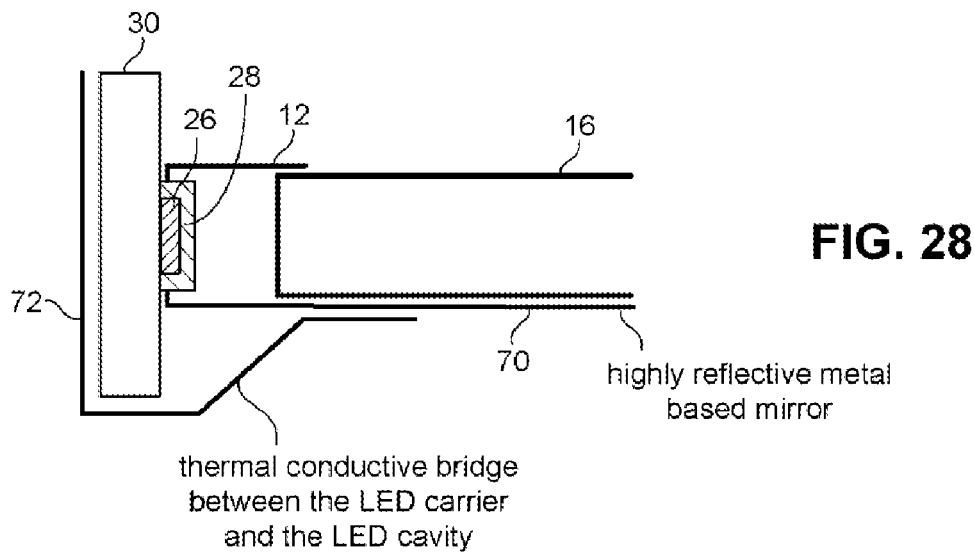
FIGS. 28, 29, 30A, and 30B are side cross-sectional views of a backlight showing LEDs within reflective cavities mounted in different configurations and showing various ways to integrate the reflective cavity with a reflector on the back surface of the light guide and techniques for sinking heat from the LED.

FIG. 28 illustrates a white LED in the reflective cavity 12 similar to that shown in FIG. 4. The bottom one of the reflective walls is extended out and expanded to cover the entire bottom surface of the light guide 16, as reflector 70, opposite to the side of the liquid crystal layers. Cooling of high powered LEDs is always a difficult problem in a small enclosure. Not only is the LED cooled by heat being removed by the metal reflective cavity 12 contacting the submount 30, but the LED is further cooled by the bottom metal wall extending over the bottom of the light guide 16. An additional metal heat sink 72 may be thermally coupled to the back of the submount 30 and contact the metal reflector 70 to further cool the LED. The heat sink 72 may be a metal bracket connected to the reflector 70 using a thermally conductive tape or paste.

It is preferable that the thermal resistance of the submount 30 material is 25K/W per LED or less.

Figure 29:
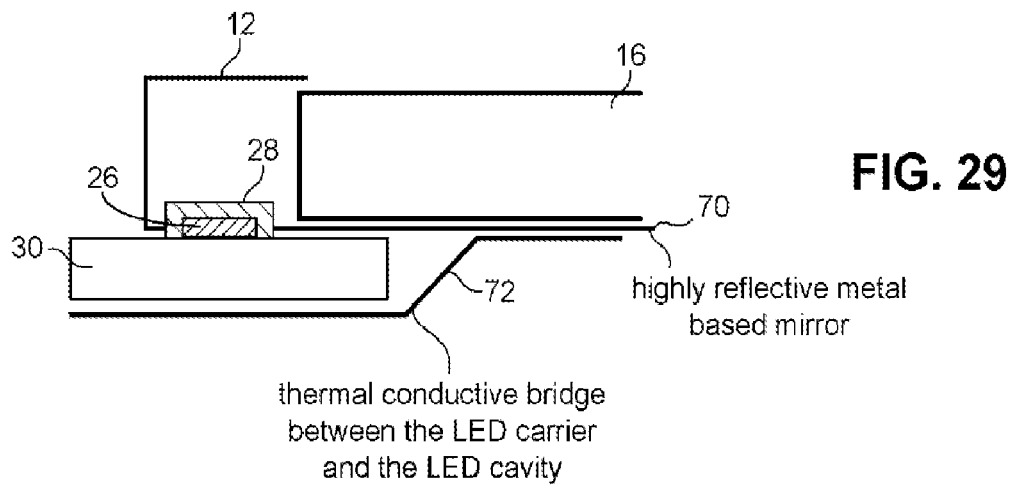

FIG. 29 illustrates an embodiment similar to FIG. 17 but where a wall of the reflective cavity 12 is extended and expanded to become the bottom reflector 70 of the light guide 16. As in FIG. 28, a heat sink 72 additionally thermally couples the submount 30 to the large reflector 70.

Figure 30A:
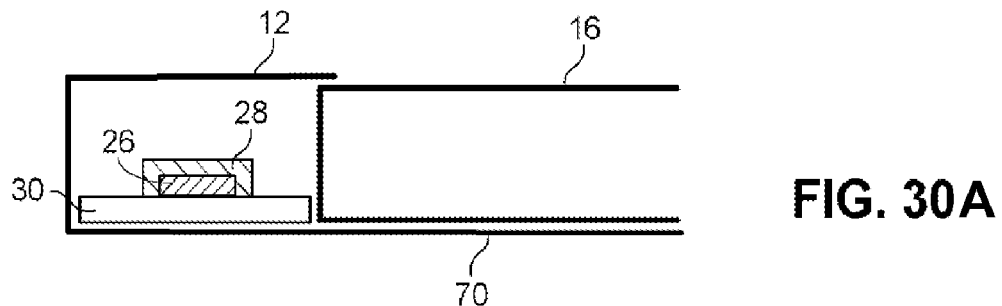
Figure 30B:
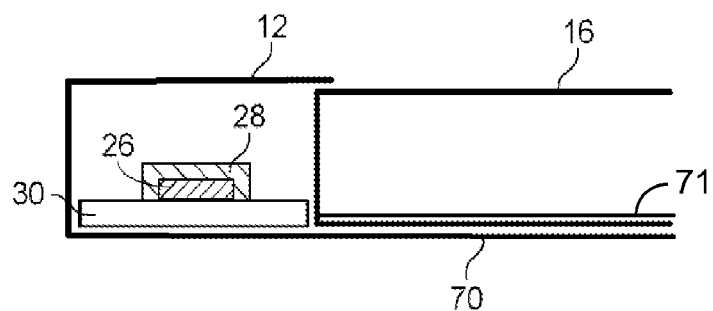

FIG. 30A illustrates an embodiment where the LED submount 30 is mounted over the bottom wall of the reflective cavity 12, and the bottom wall of the reflective cavity 12 extends and expands to become the bottom reflector 70 for the light guide 16. This results in a particularly thin backlight with very good thermal conductivity between the LED die and the reflector 70. FIG. 30B illustrates a variation of FIG. 30A, where a thin reflective film 71 on the bottom surface of the light guide 16 obviates the need for the expanded wall of the cavity 12 to completely cover the bottom surface of the light guide 16.

In the embodiments of FIGS. 29, 30A, and 30B, and the similar embodiments of FIGS. 17-19, the LED may be a side-emitting LED.

Figure 31:
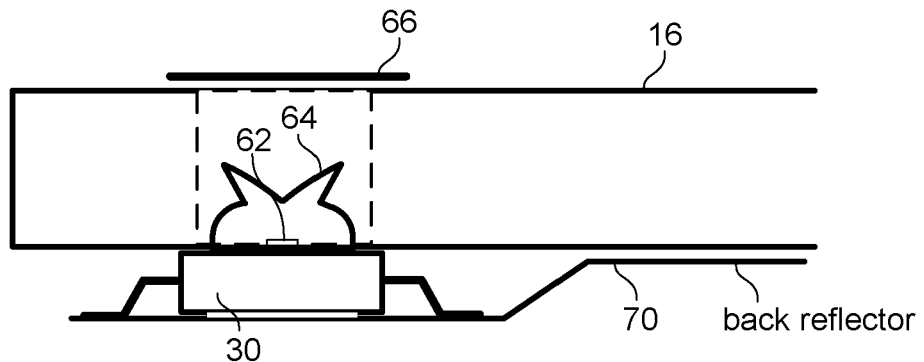
FIGS. 31, 32, and 33 are side cross-sectional views of a backlight showing different types of LEDs mounted in a cavity in the light guide near a corner and integrating a heat sink with a reflector on the back surface of the light guide.

FIG. 31 illustrates a side-emitting LED, having an LED die 62 with a side-emitting lens 64, similar to FIG. 23. The LED submount 30 is directly mounted on an extension of the metal reflector 70 for removing heat from the LED die 62. A corner reflector may be employed for added efficiency as in FIGS. 23 and 24.

Figure 32:
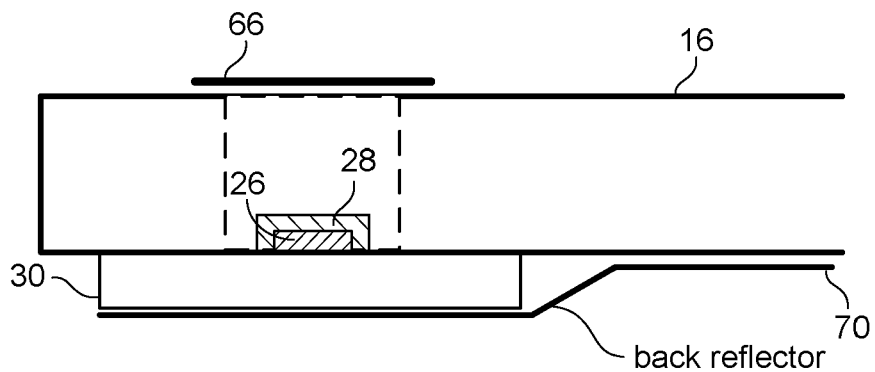

FIG. 32 is similar to FIG. 31 but the white LED does not use a side emitting lens. This is not as efficient as using a side-emitting lens, since much of the light emitted by the LED must be first reflected by the top reflector 66 and the submount 30 before entering the light guide 16. The heat sink for the submount 30 extends and expands to become the bottom reflector 70 of the light guide 16.

Figure 33:
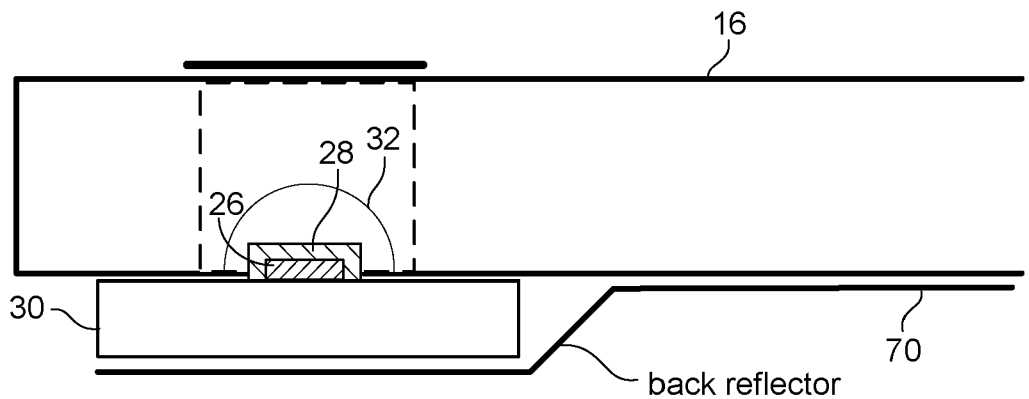

FIG. 33 is similar to FIG. 32 except that a lens 32 encapsulates and protects the LED die 26.

In the embodiments of FIGS. 28-33, the bottom surface of the light guide may have a thin reflective film, and the wall of the cavity need not extend over the entire back surface of the light guide. The heat sinking wall of the cavity may be made thicker for added heat sinking.

Figure 34:
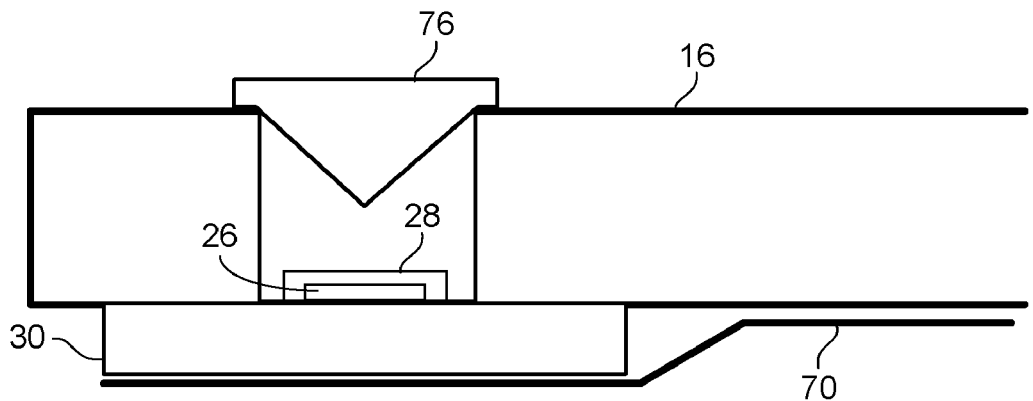
FIGS. 34, 35, and 36 are similar to FIG. 32 but show various shapes of top reflectors above the LED to provide more uniform light in the light guide.
Figure 35:
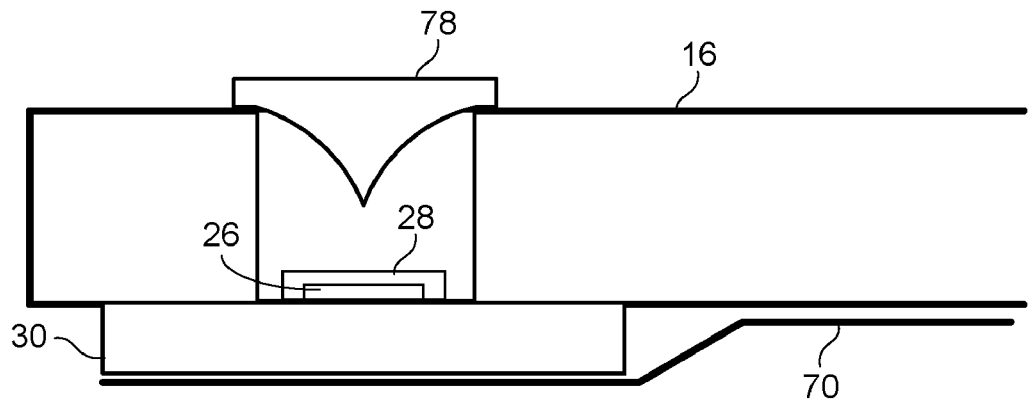
Figure 36:
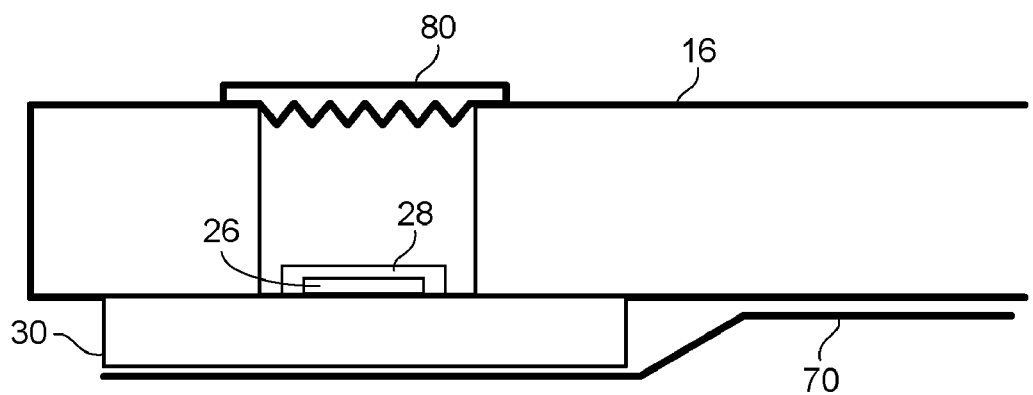

FIGS. 34-36 are similar to FIG. 32 except that the top reflector over the LED is shaped to cause the reflected light to be coupled into the light guide with the minimum number of reflections and to reduce reflections back to the LED. This improves the efficiency of the backlight.

In FIG. 34, the top reflector 76 is cone shaped.

In FIG. 35, the top reflector 78 is cusp shaped so that the reflected light is at a very low angle with respect to the inner walls of the cavity. This greatly reduces reflections off the inner walls of the cavity.

In FIG. 36, the top reflector 80 has microstructures to reflect light away from the LED.

Any combination of the embodiments is possible. All of the backlights may be used in the LCD embodiment of FIG. 2. The LCD may be color or monochromatic. For very large LCDs, additional LEDs may be mounted in conventional ways along the sides of the light guide, and the corner LEDs are essentially used to improve the uniformity across the entire light guide surface.

Having described the invention in detail, those skilled in the art will appreciate that, given the present disclosure, modifications may be made to the invention without departing from the spirit of the inventive concept described herein. Therefore, it is not intended that the scope of the invention be limited to the specific embodiments illustrated and described.

What is claimed is:

1. A light emitting device comprising:
   a light emitting diode (LED) die;
   a heat conductive submount on which the LED die is mounted, the submount having a top surface on which the LED die is mounted and a bottom surface opposing the top surface;
   a reflective cavity at least partially surrounding the LED die, the cavity having walls, the cavity having an opening for light to exit; and
   a substantially rectangular light guide formed of a solid material, the light guide having a top surface, a bottom surface, with remaining surfaces being side surfaces, the light guide adapted for supplying light as a backlight, the light guide emitting light through the top surface of the light guide, the light guide having a reflective film on its bottom surface for reflecting light through its top surface;

the opening of the reflective cavity opposing a first one of the side surfaces of the light guide, the reflective cavity having walls with only one of the walls having an extension, wherein the one of the walls and the extension comprising a metal, the extension extending over a majority of the bottom surface of the light guide, but not extending over a majority of any of the side surfaces of the light guide, wherein the bottom surface of the submount is mounted on the one of the walls of the reflective cavity having the extension, and wherein the submount is thermally coupled to the extension so that the extension acts as a heat sink for the LED die.

2. The device of claim 1 wherein the reflective cavity comprises a rectangular cavity.

3. The device of claim 1 wherein the reflective cavity comprises a rounded cavity.

4. The device of claim 1 wherein the LED die has a side surface facing the first one of the side surfaces of the light guide, the LED die having a major light emitting surface wherein the LED die is within the reflective cavity such that the major light emitting surface of the LED die is substantially parallel to the top surface of the light guide, whereby light emitted by the major light emitting surface of the LED die is reflected within the reflective cavity towards the first one of the side surfaces of the light guide.

5. The device of claim 1 wherein the reflective cavity has reflective walls that taper away from the first one of the side surfaces of the light guide.

6. The device of claim 1 further comprising a phosphor in the reflective cavity for color conversion of light emitted by the LED die.

* * * * *